United States Patent
Wicki et al.

[11] Patent Number: 5,838,684
[45] Date of Patent: Nov. 17, 1998

[54] LOW LATENCY, HIGH CLOCK FREQUENCY PLESIOASYNCHRONOUS PACKET-BASED CROSSBAR SWITCHING CHIP SYSTEM AND METHOD

[75] Inventors: Thomas M. Wicki, Palo Alto; Jeffrey D. Larson, San Jose; Albert Mu, Milpitas; Raghu Sastry, Santa Clara, all of Calif.

[73] Assignee: Fujitsu, Ltd., Japan

[21] Appl. No.: 603,926

[22] Filed: Feb. 22, 1996

[51] Int. Cl.⁶ .................................................. H04L 12/56
[52] U.S. Cl. ........................................... 370/416; 370/422
[58] Field of Search ........................... 370/398, 412, 370/415, 416, 418, 422, 427, 399, 381, 402, 419

[56] References Cited

U.S. PATENT DOCUMENTS

| | | | |
|---|---|---|---|
| 5,140,582 | 8/1992 | Tsuboi et al. | 370/416 |
| 5,166,926 | 11/1992 | Cisneros et al. | 371/60 |
| 5,241,536 | 8/1993 | Grimble et al. | 370/398 |
| 5,255,265 | 10/1993 | Eng et al. | 370/416 |
| 5,267,235 | 11/1993 | Thacker | 370/60 |
| 5,406,554 | 4/1995 | Parry | 370/381 |
| 5,475,680 | 12/1995 | Turner | 370/60 |
| 5,495,482 | 2/1996 | White et al. | 370/419 |
| 5,517,495 | 5/1996 | Lund et al. | 370/399 |
| 5,524,112 | 6/1996 | Azuma et al. | 370/402 |

FOREIGN PATENT DOCUMENTS

| | | | |
|---|---|---|---|
| 405990 A2 | 1/1991 | European Pat. Off. | H04L 12/56 |
| 588745 A1 | 3/1994 | European Pat. Off. | G06F 15/16 |

OTHER PUBLICATIONS

"Hybrid Switch for a Highly Parallel Message Passing System", IBM Technical Disclosure Bulletin, vol. 33, No. 1A, pp. 214–217, Jun. 1, 1990.

*Primary Examiner*—Hassan Kizou
*Attorney, Agent, or Firm*—Fenwick & West LLP

[57] ABSTRACT

An plesioasynchronous and asynchronous router circuit communicates with neighboring router circuits and nodes. Each of the router circuits includes a plurality of input ports for receiving frames of data and a plurality of output ports for transmitting frames of data. Each router circuit further includes a plurality of input buffers for storing frames of data received at an input port, and an arbiter system for choosing one of several input buffers associated with a particular one of said output ports. The arbiter system includes a plurality of arbiter subsystems associated with corresponding ones of said plurality of output ports. The plesioasynchronous and asynchronous router circuit further includes a crossbar switch for connecting an arbiter selected input buffer with a particular one of said output ports.

10 Claims, 18 Drawing Sheets

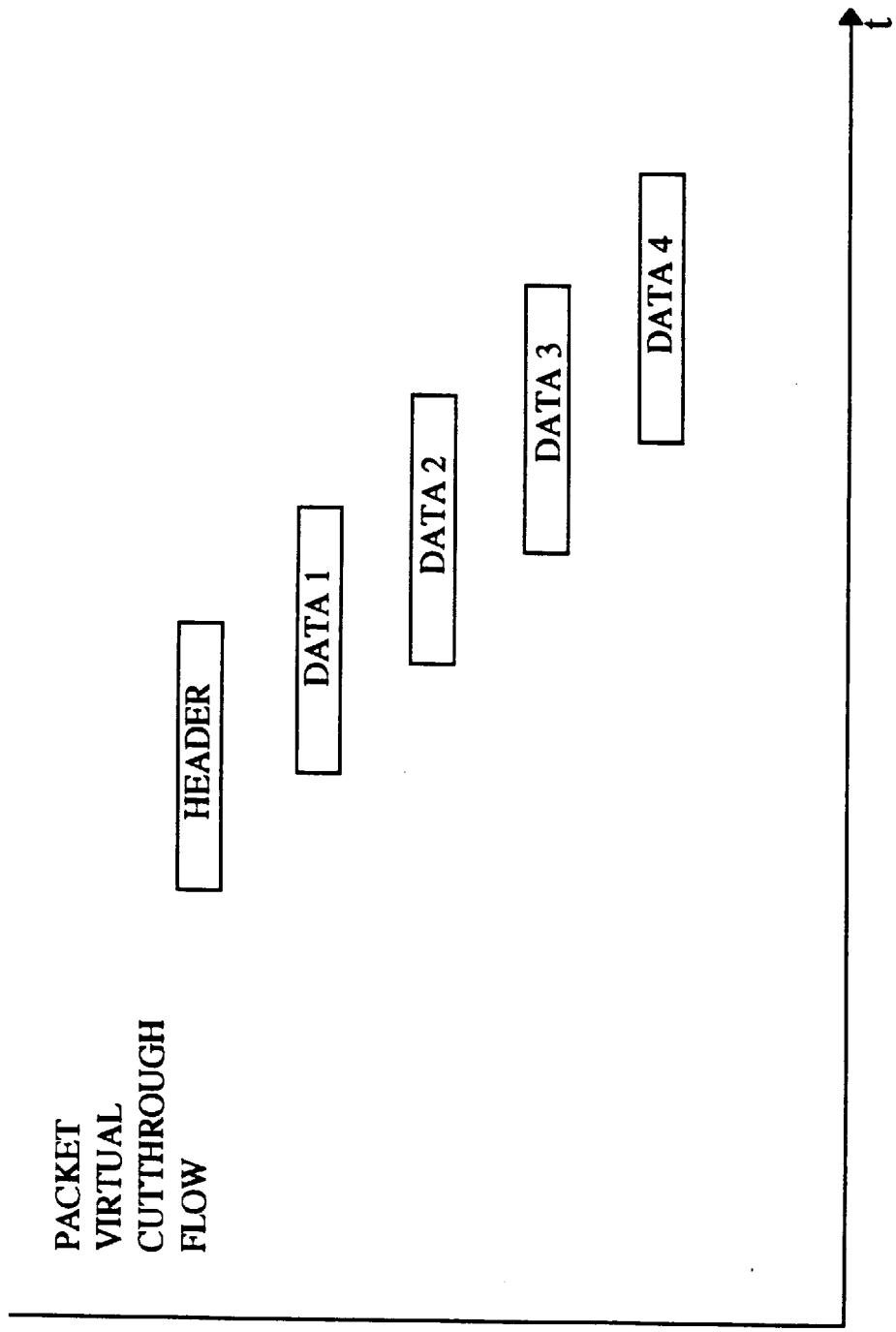

LOW LATENCY, HIGH CLOCK FREQUENCY PLESIOASYNCHRONOUS PACKET-BASED CROSSBAR SWITCHING CHIP SYSTEM AND METHOD

CROSS-REFERENCES TO RELATED APPLICATIONS

The subject matter of this application is related to the subject matter of the following applications:

application Ser. No. 08/605,677, entitled "ASYNCHRONOUS PACKET SWITCHING" filed on Feb. 22, 1996, by Thomas M. Wicki, Patrick J. Helland, Takeshi Shimizu, Wolf-Dietrich Weber, and Winfried W. Wilcke;

application Ser. No. 08/605,676, entitled "SYSTEM AND METHOD FOR DYNAMIC NETWORK TOPOLOGY EXPLORATION" filed on Feb. 22, 1996, now U.S. Pat. No. 5,740,346, Thomas M. Wicki, Patrick J. Helland, Wolf-Dietrich Weber, and Winfried W. Wilcke;

application Ser. No. 08/603,880, entitled "METHOD AND APPARATUS FOR COORDINATING ACCESS TO AN OUTPUT OF A ROUTING DEVICE IN A PACKET SWITCHING NETWORK" filed on Feb. 22, 1996, by Jeffrey D. Larson, Albert Mu, and Thomas M. Wicki;

application Ser. No. 08/604,920, entitled "CROSSBAR SWITCH AND METHOD WITH REDUCED VOLTAGE SWING AND NO INTERNAL BLOCKING DATA PATH" filed on Feb. 22, 1996, by Albert Mu and Jeffrey D. Larson;

application Ser. No. 08/603,913, entitled "A FLOW CONTROL PROTOCOL SYSTEM AND METHOD" filed on Feb. 22, 1996, by Thomas M. Wicki, Patrick J. Helland, Jeffrey D. Larson, Albert Mu, and Raghu Sastry and Richard L. Schober, Jr.

application Ser. No. 08/603,911, entitled "INTERCONNECT FAULT DETECTION AND LOCALIZATION METHOD AND APPARATUS" filed on Feb. 22, 1996, by Raghu Sastry, Jeffrey D. Larson, Albert Mu, John R. Slice, Richard L. Schober, Jr. and Thomas M. Wicki;

application Ser. No. 08/603,923, attorney docket number 2277, entitled, "METHOD AND APPARATUS FOR DETECTION OF ERRORS IN MULTIPLE-WORD COMMUNICATIONS" filed on Feb. 22, 1996, by Thomas M. Wicki, Patrick J. Helland and Takeshi Shimizu;

U.S. Pat. No. 5,615,161, entitled "CLOCKED SENSE AMPLIFIER WITH POSITIVE SOURCE FEEDBACK" filed on Feb. 22, 1996 and issued on Mar. 25, 1997, by Albert Mu;

all of the above applications are incorporated herein by reference in their entirety.

TECHNICAL FIELD OF THE INVENTION

This invention relates to asynchronous and plesiochronous packet-based crossbar switching systems and methods.

BACKGROUND

Particular prior art router systems connecting nodes in a computer mesh are latency limited because of a requirement for each router element to account for the presence of an entire packet before initiation of output transmission of even a first portion of the packet. Many such router systems are further hampered by congestion at router output ports caused by complexity in arbitration of access to particular output ports from selected input buffers. Further, many router systems include complex latency producing synchronization systems which reduce transmission throughput of data, packets, and frames.

It is desirable in semiconductor router chips transmitting packets of data including header information to minimize latency, the time required for transmission of data through a single chip in a system having a network of router chips.

It is further desirable to provide a router system resident on a single semiconductor chip.

SUMMARY OF THE INVENTION

According to the present invention, a router system establishes interconnection of input buffers selected by arbitration with a predetermined output port through a crossbar switch. According to an embodiment of the present invention, each output port has a dedicated arbiter to select a highest priority input buffer for connection to its output port. According to a method of the present invention, frame words are streamed independently through selected input buffers and output ports through a crossbar switch. Streaming according to the present invention begins with path definition established by analysis of a frame header. A parallel frame envelope signal terminates dedication of a predetermined output ports to a particular frame.

Frame transmission according to the present invention is plesiochronous—i.e., close to being synchronous. According to one, embodiment of the present invention, frame transmission is asynchronous. Simply stated, the router system according to the present invention is not synchronous. Frames arrive with one clock and are clocked out with another clock. Accordingly, transmission can be considered to be "plesioasynchronous," i.e. close to synchronous or asynchronous.

According to the present invention, frame transmission is accomplished with a distributed synchronization architecture within the router in which input buffers are checked for a read-out and a non-coincidence of read and write pointers, in which output port identification and priority level information are stored in multiple registers, and in which buffer status messages are OR accumulated.

According to the present invention, a semiconductor router chip system includes a stream-lined architecture having a high clock frequency and low latency in the transmission of data. Low latency is achieved according to the present invention by reducing operations performed on each packet, including eliminating selected error checks which are not accompanied by error correction. The present invention includes a synchronization method which minimizes latency. According to the present invention, internal chip data processing is accomplished on a data path which is twice as wide as external communication between router chips. The data path according to the present invention includes a fully connected crossbar switch without internal blocking, providing a dedicated connection to the crossbar for each buffer element of the input buffers. This decouples the arbitration unit for output ports from each other. Other features use a flow-control protocol which is handled outside of the critical path, and supporting virtual cut-through routing according to the present invention. Further according to the present invention, the data path includes out-of-band signaling to mark the beginning and end of data packets, thereby reducing decoding of the data stream significantly. Additionally according to the present invention, the path length in each of the pipeline stages is minimized by reducing operations performed, thereby permitting high frequency chip operation.

The router system according to one embodiment of the present invention is resident on a single semiconductor chip.

BRIEF DESCRIPTION OF THE DRAWINGS

FIG. 7E is a timing diagram of packet virtual cut through according to the present invention, in which the transmission of header and data information is staggered in independent words of information.

DETAILED DESCRIPTION OF THE INVENTION

Figure 1:
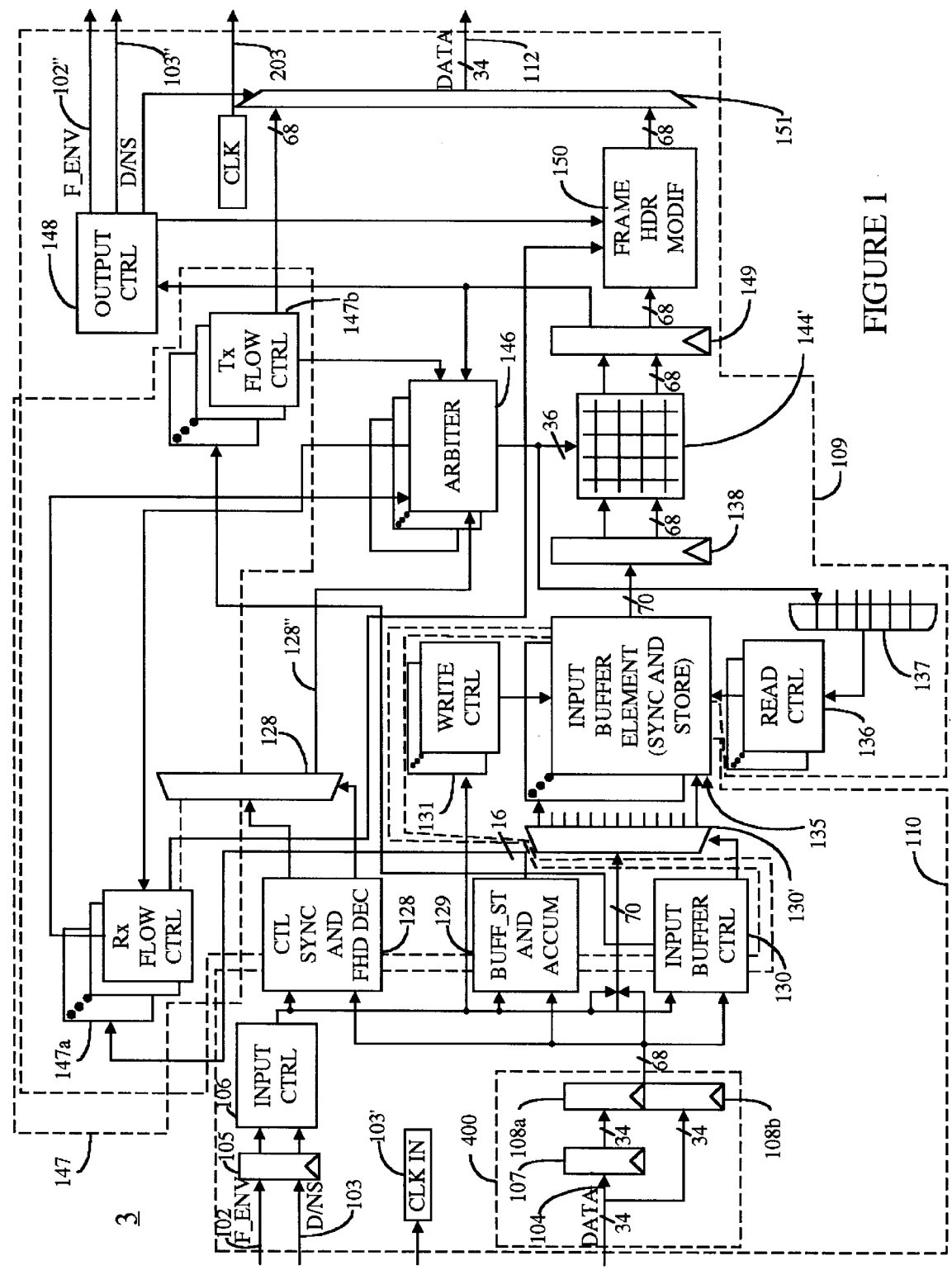
FIG. 1 is a block diagram of a router chip according to the present invention.

FIG. 1 is a block diagram of a router system 3 according to an embodiment of the present invention, which is resident on a single semiconductor chip. Router system 3 includes a virtual-cut-through packet switch including a plurality of input ports 104, one of which is shown in FIG. 1.

According to one embodiment of the present invention, each input port 104 is 34 bits wide. Data is received at an input port on both rising and falling input clock edges. Each port 104 is symmetric. Each port 104 is connected to a multiple entry input buffer unit 135 through a demultiplexer 400 which includes a register 107 and first and second parallel registers 108a and 108b respectively. Register 107 receives a half word at a first portion of a clock cycle, and during the next portion of a clock cycle the contents of register 107 are entered into first parallel register 108a while the remaining half word is entered directly from port 104 into second parallel register 108b. The contents of parallel registers 108a and 108b are then entered into demultiplexer 130' for insertion into the appropriate buffer element 135. Route system 3 includes a queuing arbiter unit 146 and a flow control unit 147 including first and second flow control systems respectively 147a and 147b. Router system 3 further includes an input register 105 connected to a frame envelope (F_ENV) input line 102 and a data-not-status (D/NS) input line 103. Input register 105 is in turn connected to an input control circuit 106 which provides frame envelope and D/NS signals to control synchronization and frame header decoder circuit 128, to a buffer status and accumulator circuit 129, and an input buffer control circuit 130. Flow control receiver circuit 147 is connected to buffer status and accumulator circuit 147a to receive buffer status signals and information from buffer status and accumulator circuit 147, as will be discussed in greater detail below. Flow control receiver circuit 147a receives information from arbiter 146 regarding its status, and provides information to frame header modifier circuit 150 and arbiter 146. Input control circuit 106 provides signals to write control circuit 131 which in turn controls write operations with respect to input buffer elements 135. Arbiter 146 controls crossbar switch 144' and controls read control circuit 136 to permit reading of input buffer element 135 frame portions into register 138. Register 149 receives frame portions from crossbar switch 144' and provides them to frame header modifier 150. Register 138 additionally provides information to output control circuit 148 which produces frame envelope (F_ENV) and (D/NS) signals to an adjacent router or node of a mesh of router chips and nodes. Multiplexer 151 receives frames with modified headers from frame header modifier 150 and from flow control transmitter circuit 147b. Multiplexer 151 receives word wide frame portions every clock cycle and produces half-word wide frame portions at both rising and falling clock edges. Router system 3 further includes a mesh link clock domain 110 per input port and a local clock domain 109. Mesh link clock domain 110 is clocked according to input clock 103'. Local clock domain 109 is clocked according to local clock 203.

According to one embodiment of the present invention, router system 3 can operate with a clock frequency of 200 MHz and beyond for multiprocessor interconnects. With latency-tolerant link level flow control and flexible multiple clock domain plesiochronous communication, router system 3 supports interconnection of processing nodes separated by distances on the order of several meters. A plurality of router chips 3 are scalably interconnectable.

Figure 2:
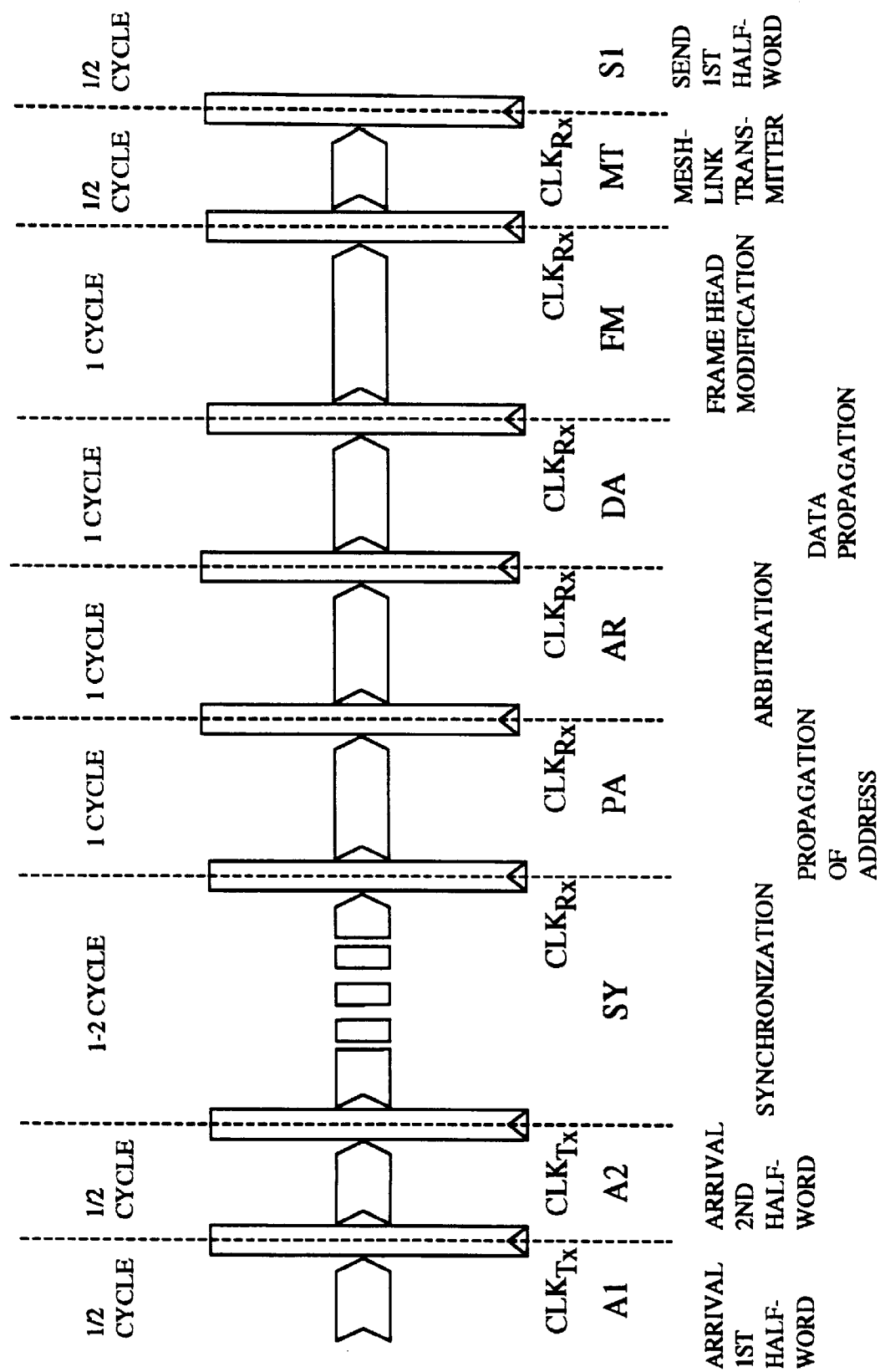
FIG. 2 is a diagram of a multiple stage pipeline method according to the present invention, including one-cycle arbitration.

FIG. 2 is a diagram of a multiple stage pipeline method according to the present invention, including one-cycle arbitration. As shown in FIG. 2, the method of the present invention includes synchronization of information from mesh link clock domain 110 to local clock domain 109. Additionally, the method of the present invention includes conducting address propagation and decoding. Routing information received at an input port is broadcast to queuing arbiter units 106. The method of the present invention further includes arbitration. The method of the present invention further includes data propagation through cross bar switch 144'. The method of the present invention further includes frame header modification.

According to the present invention, data, clock, and out-band control signals arrive at one of n input ports. Data is latched on both edges of the arriving clock in order to optimize link bandwidth. Data is demultiplexed to a data path width internal to the switching unit. The broadened data path width permits internal logical operations at half the clock rate. Data is communicated in frames including header and data portions in streams through a selected one of m input buffer elements. The sender selects the particular one of the m input buffer elements based on flow control information which it receives prior to transmission. Each buffer element is connected to a dedicated path into a crossbar matrix, thereby eliminating blockage of frames from one input port destined for particular output ports, in the case of these output ports being idle. Each buffer element is large enough to store a maximum sized frame in case of contention. The switching unit supports virtual cut through routing. The input buffer synchronizes data from the incoming to the local clock domain, by receiving input data according to input clock signal and by producing data with an output clock signal. Routing information in each frame header is provided to a frame header decoder 128. After evaluation of the routing information, an input buffer element address is stored in an arbitration unit 146 corresponding to a selected one of n output ports. Each buffer element has a dedicated path to the crossbar matrix, permitting the frame to be switched to a selected output port. Frame header modification is accomplished by removing the current routing step and inserting a new input buffer element address for the next downstream neighbor. The appropriate input buffer elements 135 which are available are extracted from flow control information arriving from the next downstream neighbor. Data is multiplexed from the double wide internal path to an external path width. Clock and out band control signals are added and transmitted in parallel with the data.

A flow control method according to the present invention is based upon credit based flow control operation of router system 3, as is described in detail in cross-referenced patent applications referenced herein. Router chips 3 transmit frames only when empty buffers are available for receipt of a frame of information. A receiving router chip or node accordingly informs a sending router chip how many buffers are available by sending buffer status messages. These messages are interleaved with regular data frames and are default traffic on an idle link. Flow control follows a robust, self-healing protocol secure against transient errors. Router system 3 according to the present invention includes a time-out mechanism to recover input buffers from permanent loss due to transmission errors. To prevent blocking of buffer status messages, transmission of the buffer status messages receives priority over data frames, if an out-of-sync condition exists, as detailed in the referenced patent applications.

Figure 3A:
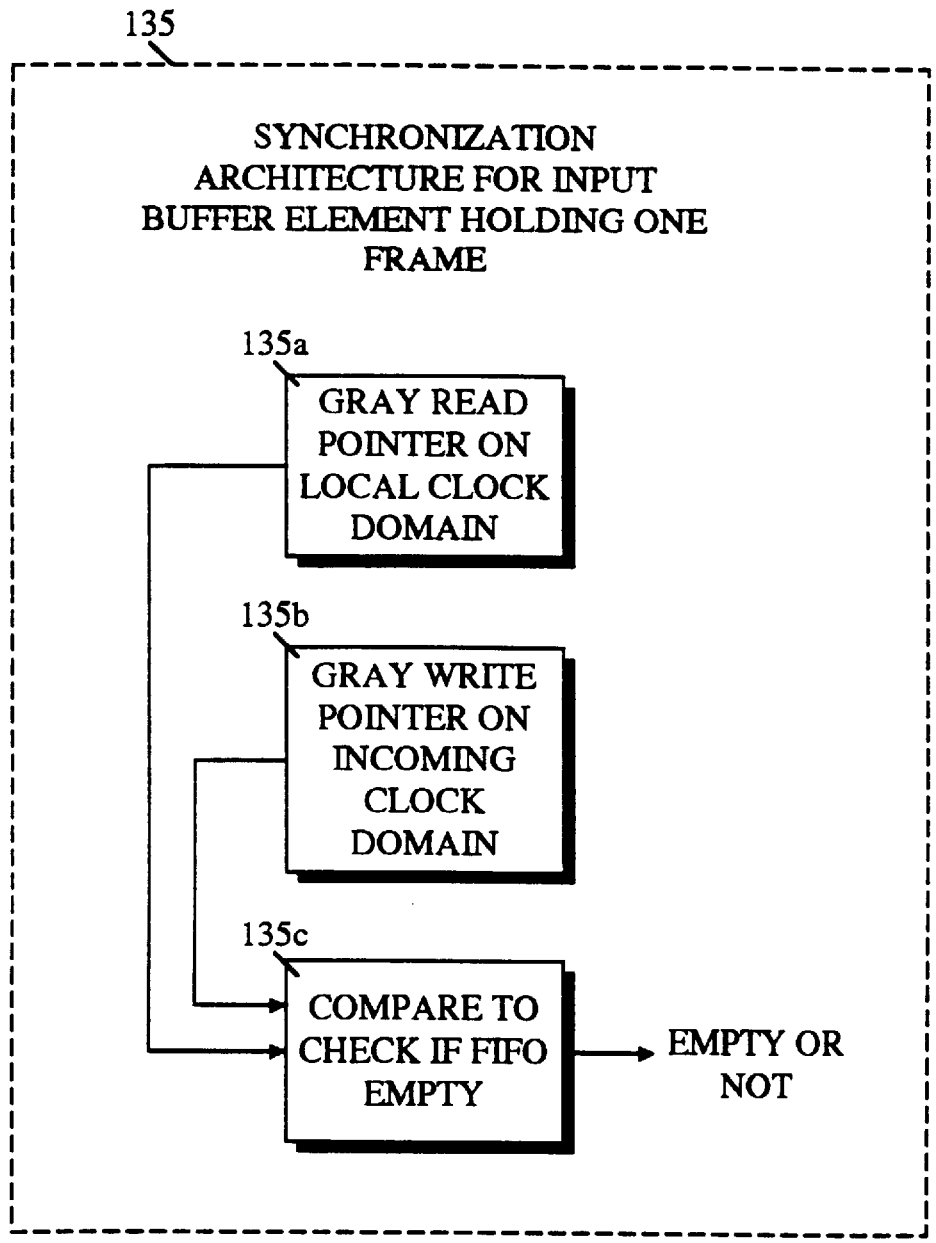
FIG. 3A is a diagram of an input buffer element synchronization architecture according to the present invention.

FIG. 3A is a diagram of the synchronization architecture of input buffer element circuit 135, according to the present invention, which holds a frame. In particular, input buffer element circuit 135 includes a Gray read pointer 135a operating on a local clock domain, a Gray write pointer 135b operating on an incoming clock domain, and a compare element which checks to determine whether a particular FIFO buffer element for holding a frame or frame portions is empty or not. Synchronization is a condition which is fulfilled when stable data has been read out and the write pointer is advanced. By using Gray code in pointers 135a and 135b for pointer compression errors are avoided. A buffer element is considered empty according to the present invention when both the Gray read pointer and the Gray write pointer are equal, indicating that both read and write operations have been completed as to the particular buffer, and resulting in read operation being stopped. Completion of both read and write operations indicates successful data synchronization.

Figure 3B:
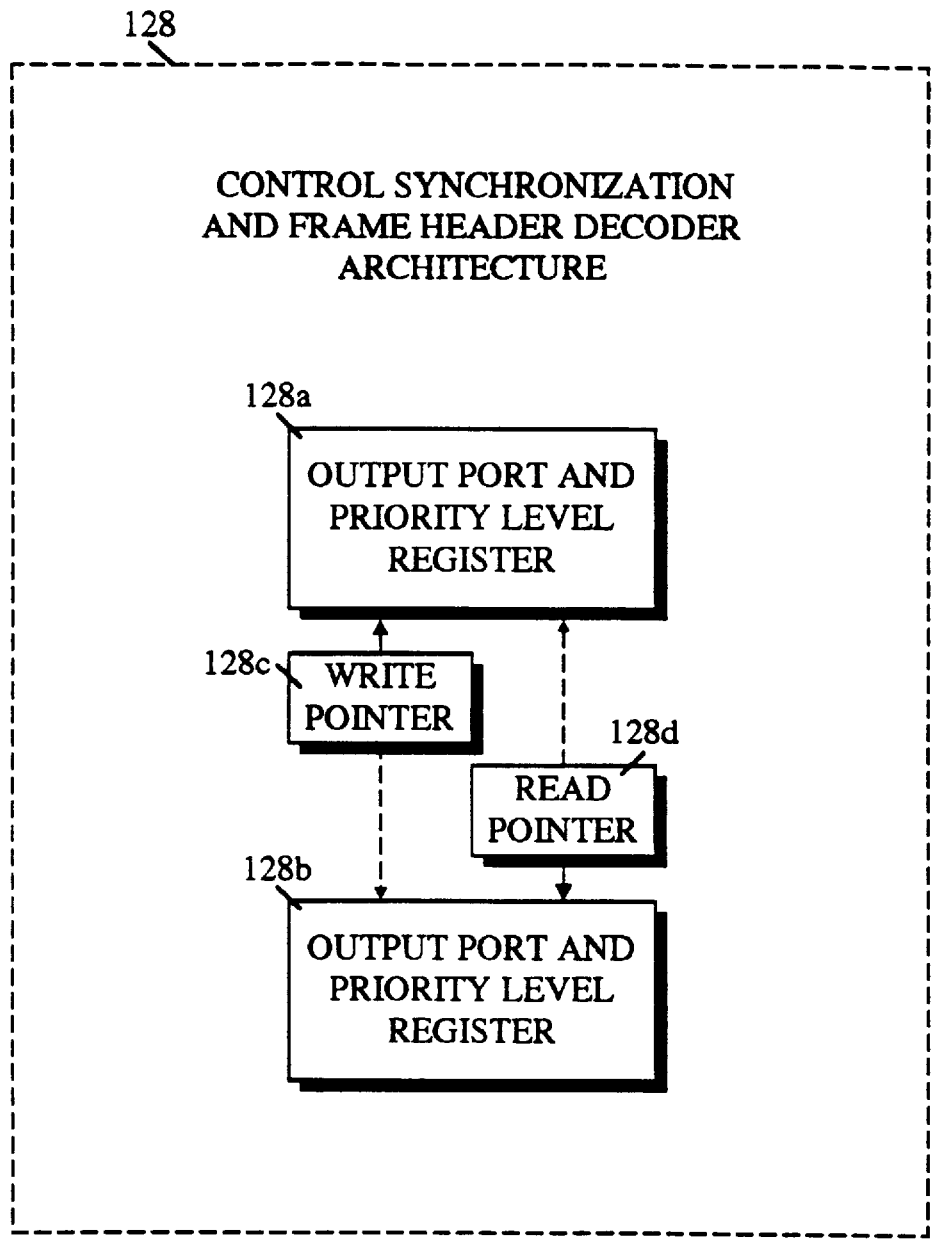
FIG. 3B is a diagram of a control synchronization and frame header decoder architecture according to the present invention.

FIG. 3B is a diagram of the synchronization architecture of control synchronization and frame header decoder circuit 128. In particular, control synchronization, and frame header decoder circuit 128 includes first and second output port information and priority level information FIFOs respectively 128a and 128b to construct a single FIFO. If one of these registers is in a full condition write pointer 128c and read pointer 128d can point to one or the other of the registers to accomplish read or write operation. Synchronization occurs because the buffer persists in availability for stable read and write operations, i.e., the accumulator is open for buffer status messages continuously to be read and written.

Figure 3C:
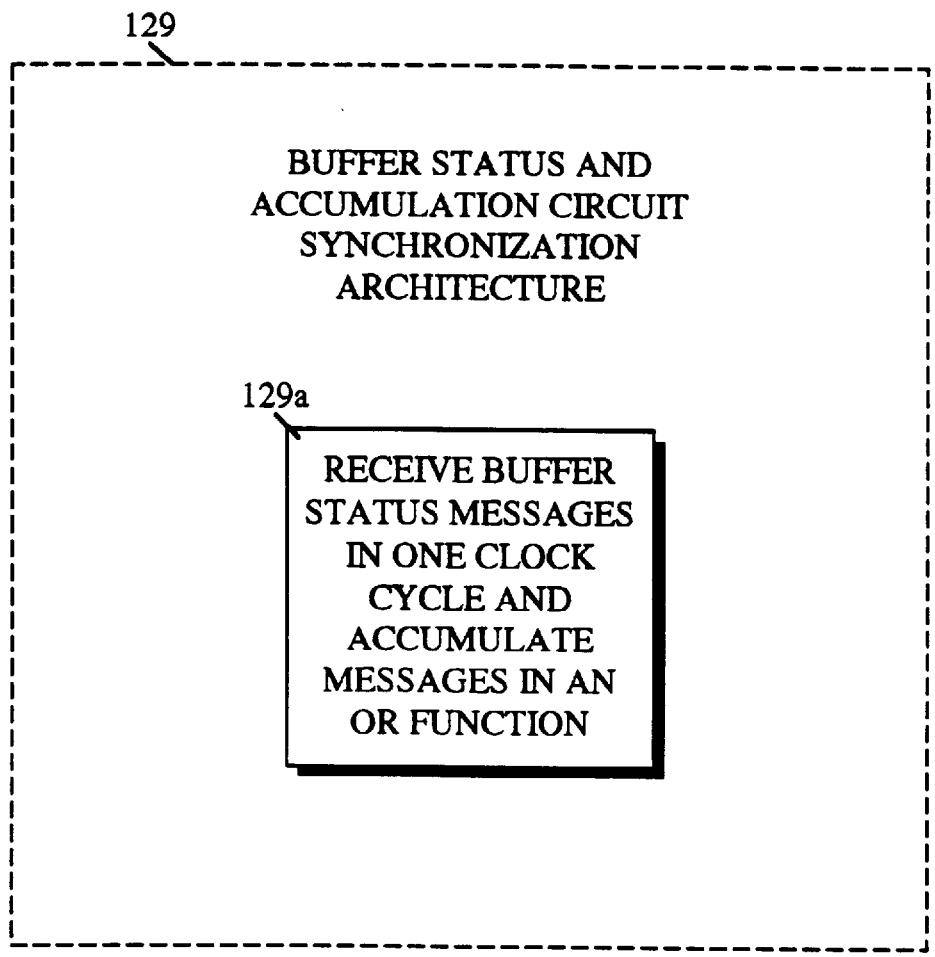
FIG. 3C is a diagram of a buffer status and accumulation circuit synchronization architecture according to the present invention.

FIG. 3C is a diagram of the architecture of buffer status and accumulation circuit 129. In particular, status and accumulation circuit 129 includes an accumulating OR buffer which is extended in bit positions and can receive messages or message indications at selected bit locations by accumulating messages in an OR function synchronization.

Figure 3D:
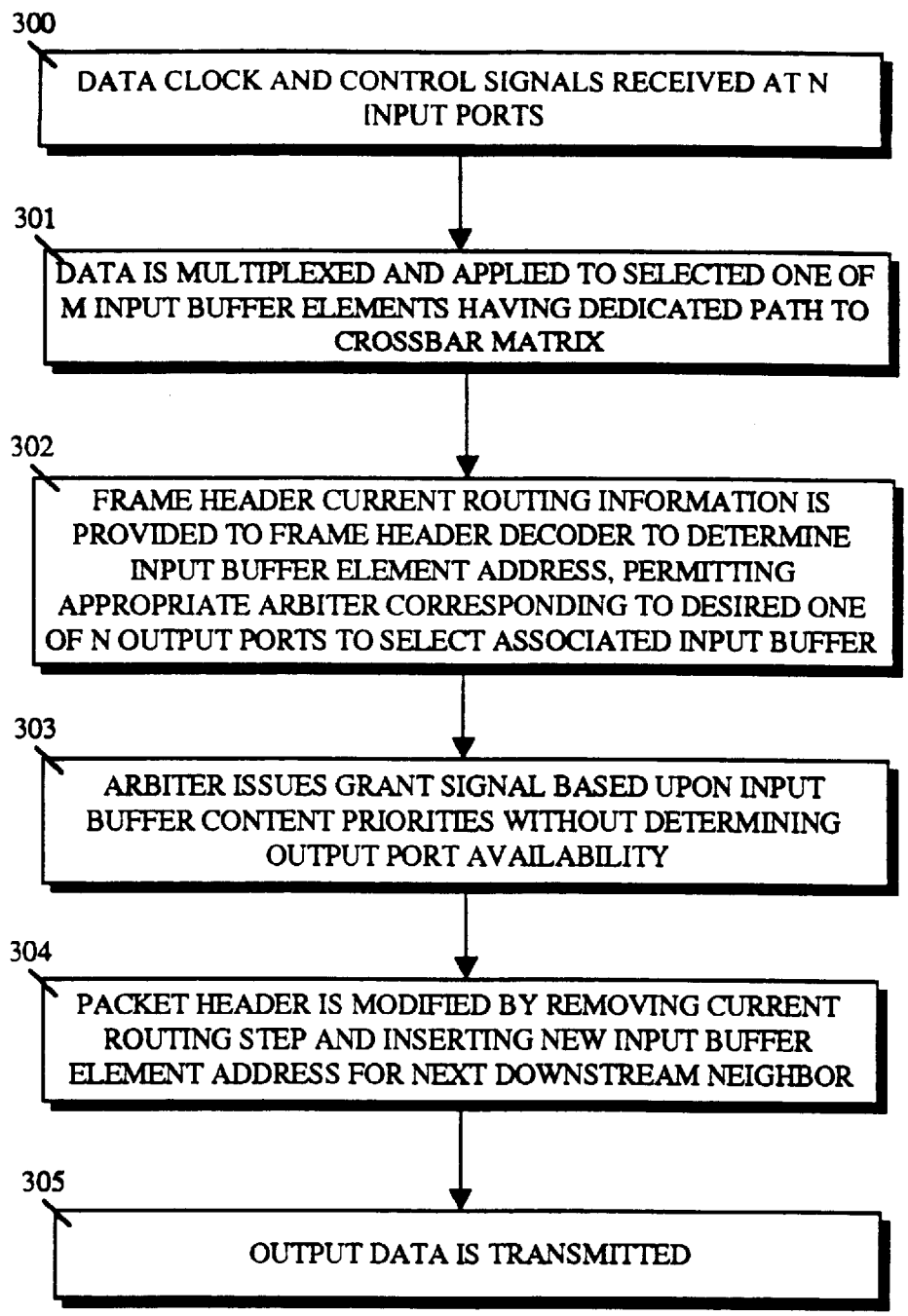
FIG. 3D is a flow chart of operation of the router system according to the present invention.

FIG. 3D is a flow chart of operation of router system 3 according to the present invention. In particular, each router system 3 according to the present invention interfaces with six independent incoming clock domains driven by a clock signal arriving with a data frame. Data, clock and control signals are received 300 at n input ports. Each router system 3 has a local clock domain which is shared among global logic and the plurality of output ports. FIFO synchronization is implemented by each router chip for frame data. Interconnected router chips will each have an independent clock source. Accordingly, interconnected router chips according to the present invention accommodate a modicum of frequency diversity between receiving and sending clocks. Data is demultiplexed 301 and applied to a selected one of m input buffer elements, each having a dedicated path to a crossbar matrix, according to the present invention. Synchronization between input and local clock domains is accomplished at an input buffer element performing synchronization of frame data and providing storage for output port contention. Synchronization of input buffer element flags is accomplished by comparing Gray coded pointers asynchronously sampled by a metastability hardened latch. Additionally according to the present invention, a header contains information indicating a destination port. In particular, frame header current routing information is provided 302 to a frame header decoder to determine input buffer element address, permitting an appropriate arbiter corresponding to a desired one of n output ports to select a particular input buffer element and the information contained therein. The header additionally provides information indicating priority. According to the present invention, the header is synchronized in a two-entry FIFO. Since headers cannot arrive back-to-back in consecutive cycles, a FIFO overflow cannot occur before data can be securely read. Further as only buffer status messages can arrive at a sufficient rate to cause FIFO overflows, according to the present invention buffer status messages are accumulated for sampling into the local clock domain which avoids the use of a FIFO. According to the present invention, router system 3 includes a cross-bar structure to which each stored packet has dedicated input port access. No contention is possible for an input to the cross-bar. A dedicated arbiter 146 per port arbitrates its own output port. As a result of the present invention, internal blocking is eliminated and arbitration can be accomplished in one clock cycle. In particular, the arbiter issues 303 a grant signal based upon input buffer content priorities. One arbiter 146 per output port with three aging FIFOs for three queue classes, i.e., priorities, is used to avoid starvation within a given priority. FIFO ordering according to the present invention is implemented to favor frames from buffers which are relatively full.

Router system 3 according to the present invention accommodates frame traffic in multiple priority levels, permitting strategies preventing protocol deadlock without infinite buffer resources on the sending or receiving nodes. Router system 3 according to the present invention adapts and overcomes difficulties such as transmission errors on links or soft RAM errors. Since, each arbiter 146 uses RAM to store requests, RAM errors can cause false request generation, loss of real requests, or grant of an incorrect request. Accordingly, self-consistency checking mechanisms are included in router system 3 according to the present invention. In particular, according to the present invention, router system 3 is reset if the arbiter unit 146 sends a frame to an erroneous output port. According to an embodiment of the present invention, router system 3 is reset when a frame stays in an input buffer for an excessive length of time.

Figure 4A:
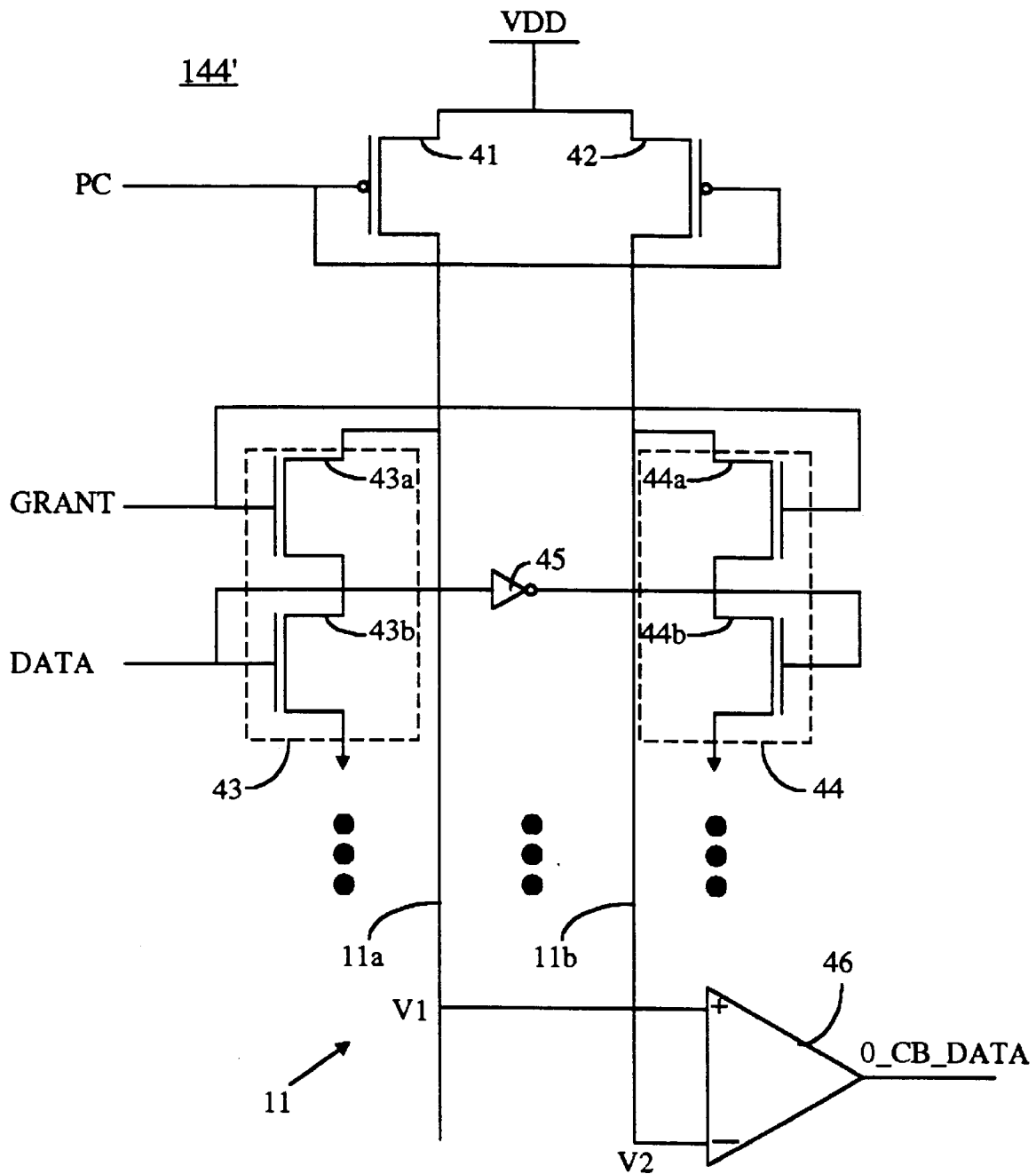
FIG. 4A is a circuit diagram of a cross bar switch according to the present invention including a switching bus in turn including metal and cross-point switches.

FIG. 4A is a circuit diagram of portion of a cross bar switch 144' according to the present invention including a switching bus in turn including metal and differential logic cross-point switches. In particular, FIG. 4A shows cross bar switch portion comprising a switching bus 11 including first and second bus sides 11a and 11b respectively in turn including, according to one embodiment, 10 mm metal and 36 cross-point switches. Crossbar switch 11 is precharged by signal PC(precharge) applied to the gates of precharge transistors 41 and 42 which are connected to VDD. Switching is accomplished with respect to received DATA by transistor circuit 43 responsive to GRANT signals received by transistor 43a. A GRANT signal is applied simultaneously to the gate of transistors 43a and 44a. Once enabled by a GRANT signal, DATA can be applied through transistor 43b and the complement of the DATA is concomitantly applied to transistor 44b. An inverter 45 changes DATA to its complement. Cross bar switch 11 further includes a differential, reduced-swing circuit to speed signal propagation. According to one embodiment of the present invention, bit line swing is set to be on the order of 500 mV. Cross bar switch 11 includes sense amplifier 46 designed, according to one embodiment of the present invention, to have a 0.2 ns sensing time.

Figure 4B:
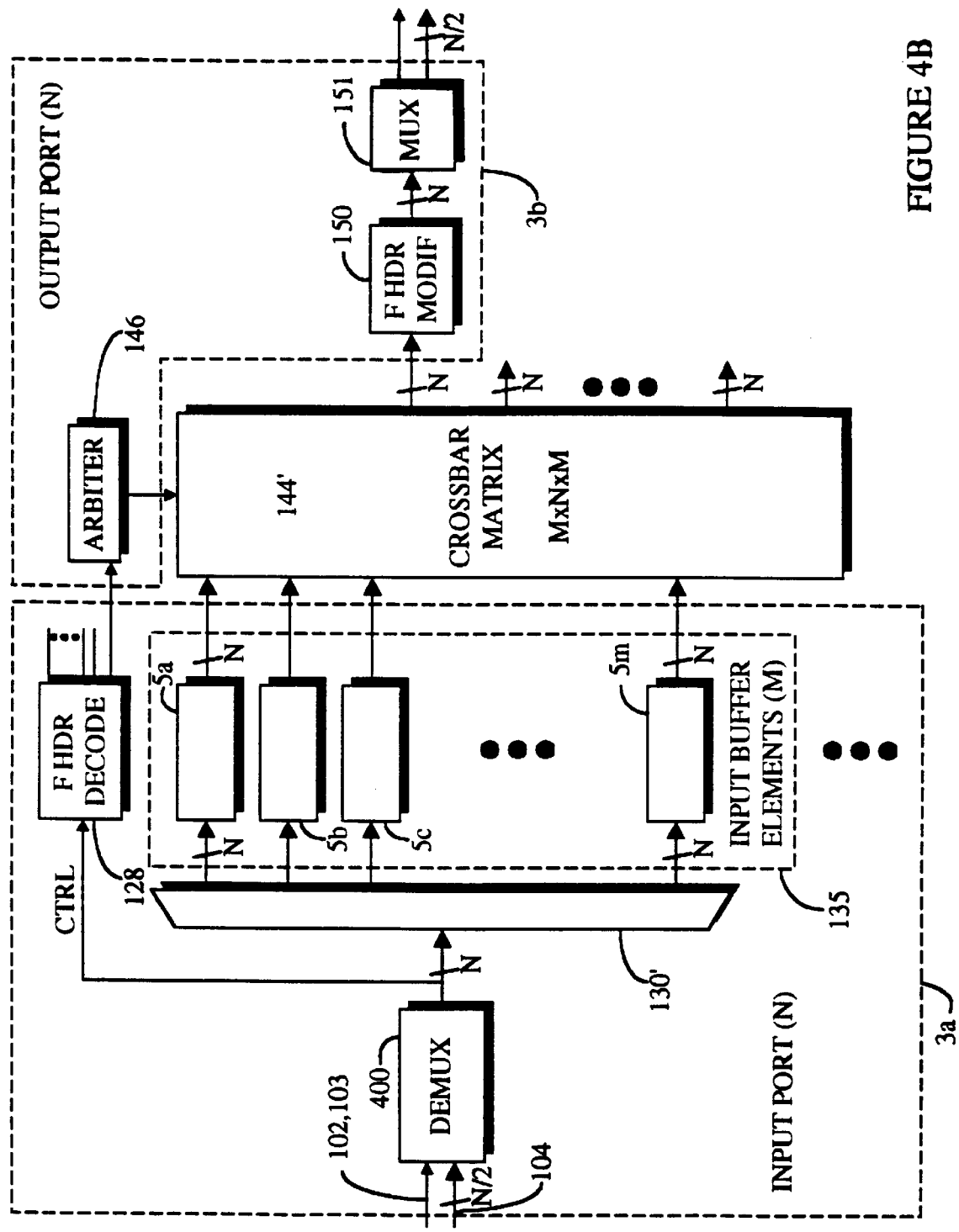
FIG. 4B is a data path block diagram according to the present invention.

FIG. 4B is a data path block diagram according to the present invention. In particular, router system 3 includes an input port 3a, an output port 3b, and a crossbar matrix 144'. Input port 3a includes demultiplexer 400, multiplexer 130', frame header decoder 128, and input buffer elements 135 including buffer elements 5a–5m. Output port 3b includes arbiter 146, frame header modifier 150, and multiplexer 151.

Data received at input port 104 passes through demultiplexers 400 and 130' to a selected one of input buffers 5a–5m. Each input buffer has a dedicated line directly to crossbar matrix 144' without requiring any arbitration to select connection of any one of input buffers 135 to crossbar matrix 144'. An arbiter 146 is provided for each output port of crossbar matrix 144' to select one of input buffers 5a–5m for connection to the associated output port. Control signals are provided at input ports 102, 103 through demultiplexer 400 to frame header decoder 128 to indicate the presence of a frame header. This allows extraction of an input buffer address through crossbar 144' under control of arbiter 146. After output transmission from crossbar 144' frame headers are modified to shift forward destination locations to follow and to delete the destination location of the current router system 3. After output from frame header modifier 150, frames are multiplexed by multiplexer 151 to convert from an N wide word being transmitted each clock cycle to providing an N/2 wide half word every half clock cycle triggered at both rising and falling clock edges.

Figure 5A:
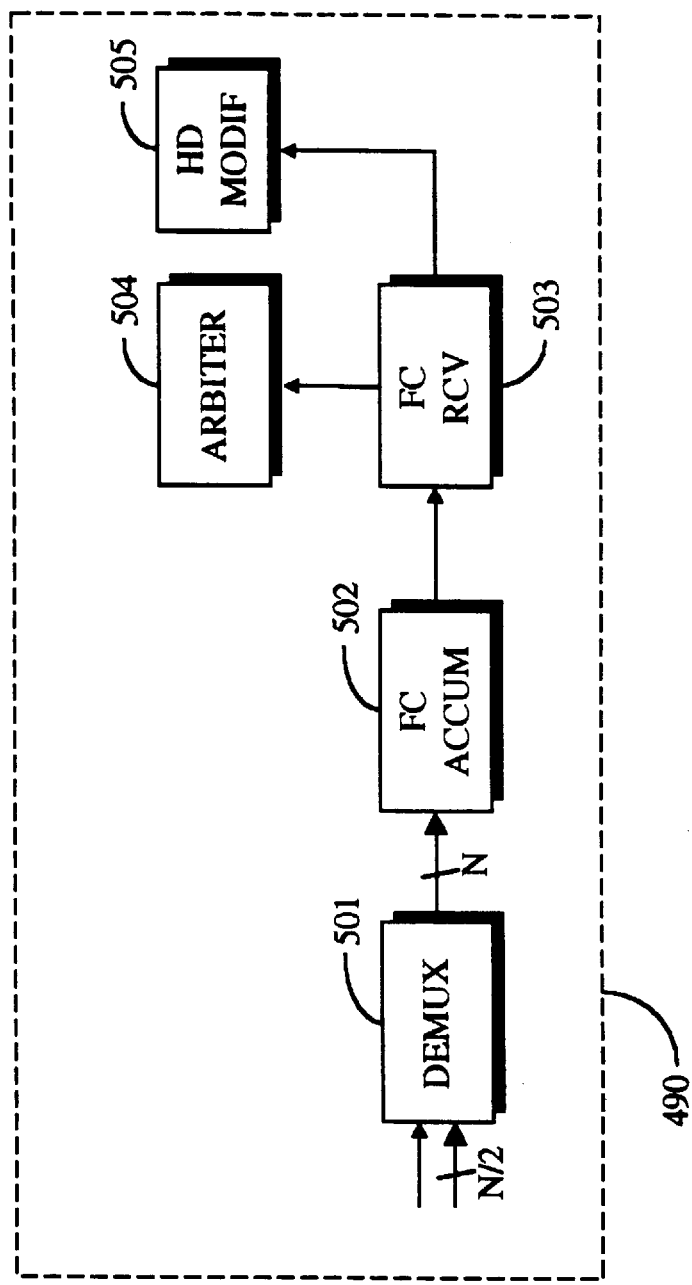
FIG. 5A is a block diagram of a first portion of a flow control path according to the present invention.

FIG. 5A is a block diagram of a first flow control path system 490 for receiving data, clock and control signals from an adjacent switching unit, according to the present invention. In particular, flow control in a selected switching unit is accomplished by receiving flow control information on a path which is n/2 wide for a predetermined (n) number of bits. The flow control information is time multiplexed on the same path as data which arrives at the switching unit. As is shown in FIG. 5A, flow control information is demultiplexed by a demultiplexer 501 (DeMux) to an internal double width path which is n bits wide. For synchronization of incoming information, from an input clock domain, flow control information is accumulated in a flow control (FC) accumulator 502 (FC Accum), to avoid information losses during synchronization. First flow control path system 490 further includes a flow control receiver 503 which evaluates the information received and forwards control signals to an arbitration unit 504. Additionally, flow control receiver 503 forwards available buffer element addresses to a frame header modifier 505.

Figure 5B:
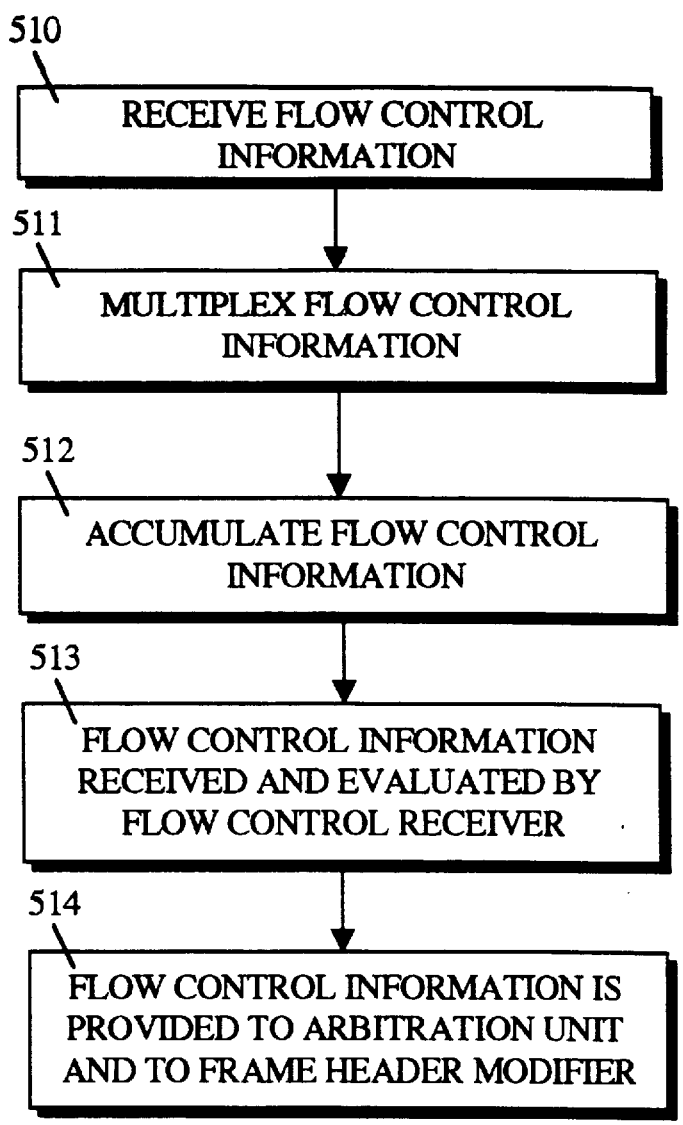
FIG. 5B is a block diagram of a second portion of a flow control path according to the present invention.

FIG. 5B is a flow diagram of the operation of first flow control path system 490. In particular, flow control information is received 510, demultiplexed 511, accumulated 512 (and thereby also synchronized), evaluated 513, and provided 514 to the arbitration unit 504 associated with a particular output port. Additionally, the information is provided to a packet header modifier 505.

Figure 5C:
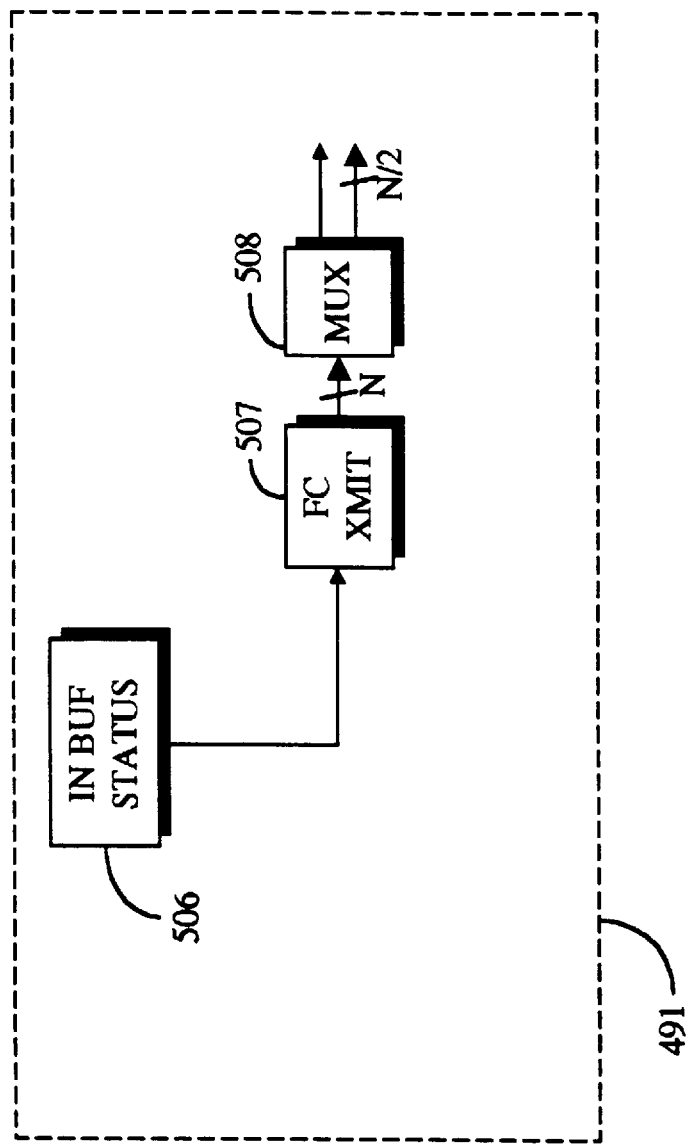
FIG. 5C is a flow diagram of a first portion of a flow control path according to the present invention.

FIG. 5C is a block diagram of a second flow control path system 491 according to the present invention. In particular, second flow control path system 491 includes a input buffer status determination element 506, a flow control transmitter 507, and a multiplexer 508.

Figure 5D:
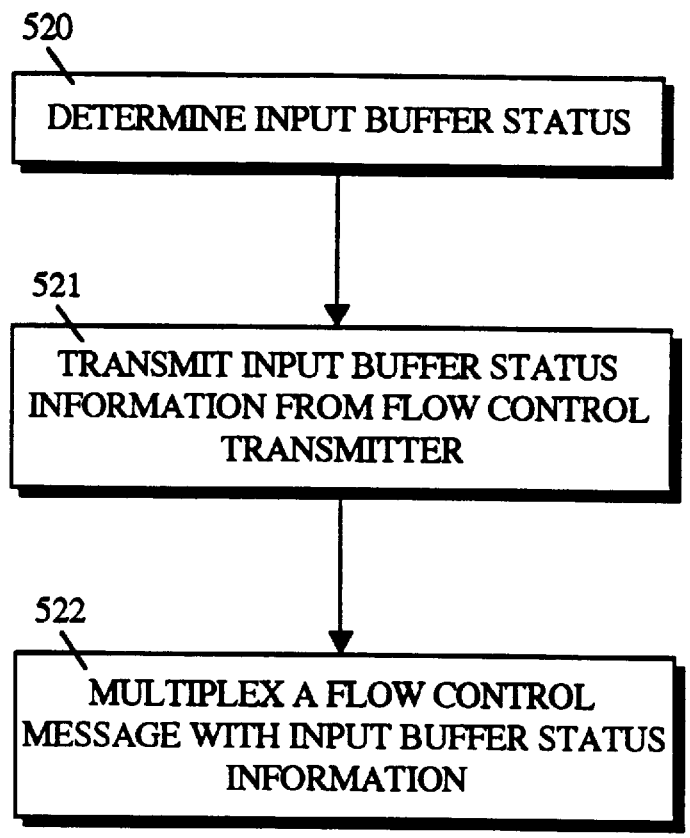
FIG. 5D is a flow diagram of a second portion of a flow control path according to the present invention.

FIG. 5D is a flow diagram of a second portion of a flow control path according to the present invention. In particular, FIG. 5D is a flow diagram of the operation of second flow control path system 491. First flow control path system 491 determines 520 input buffer status, transmits 521 input buffer status information from flow control transmitter 507, and multiplexes 522 a flow control message with input buffer status information for N-bit communication to a next node from the internal N-bit wide path to the external path of N/2 bits.

Figure 6:
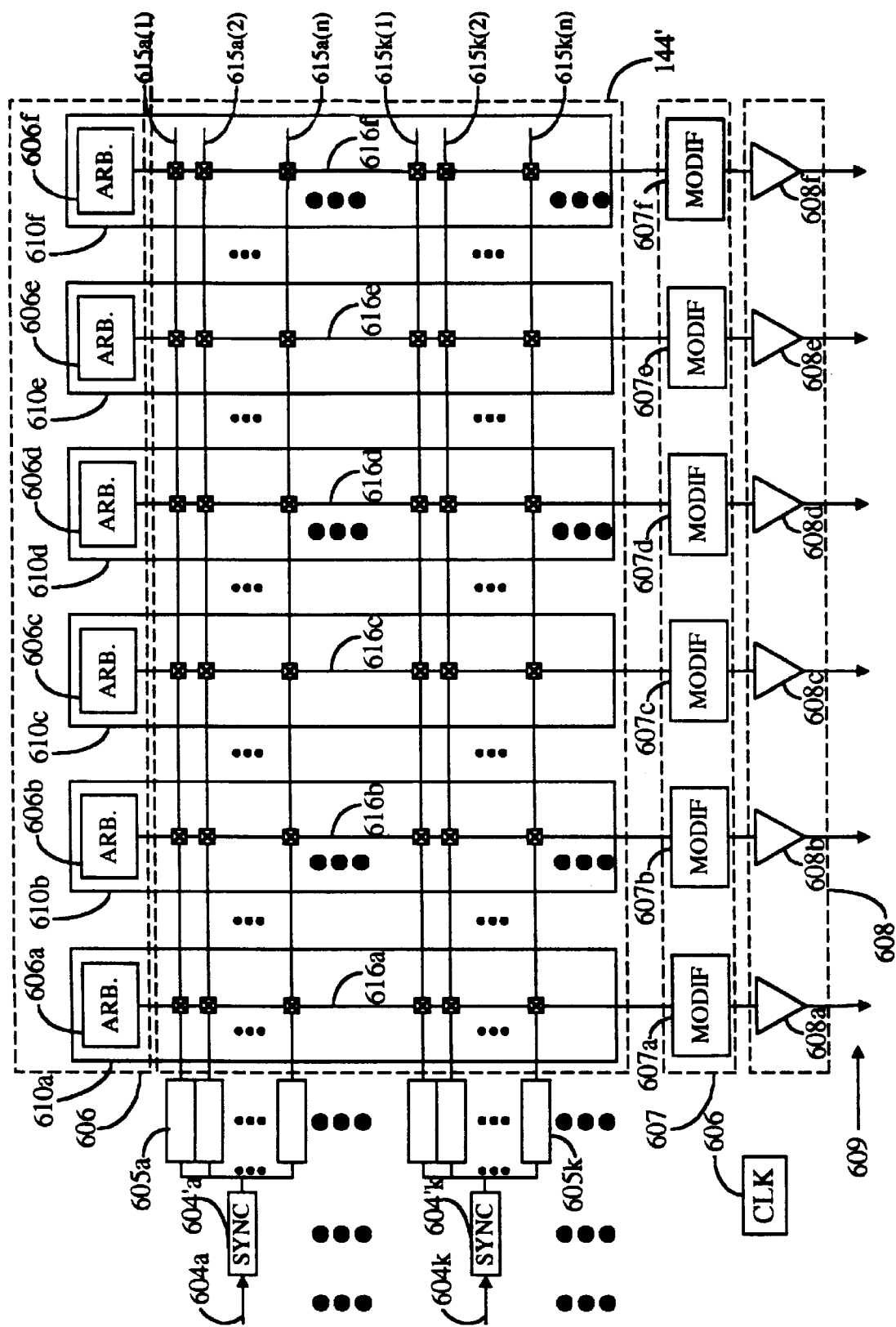
FIG. 6 is a block diagram of the router chip system according to the present invention.

FIG. 6 is a block diagram of a portion of router chip system 3 according to the present invention. Router chip system 3 according to the present invention includes a virtual-cut-through packet switch including a plurality of input ports 604, one of which is shown in FIG. 1. Each input port 604i is associated with a plurality of buffer elements 605j each of which is associated with a corresponding crossbar input line 615i(j) which is connectable with any selected one of output lines 616a–616f. Each input port 604 is symmetric and is associated with a central cross-bar switch 144'. Each port 604 includes K input lines and is connected to a multiple entry input buffer unit 605, and an arbiter 606.

Arbiter 606 includes a plurality of arbiter units 606a–606f respectively associated with crossbar output units 610a–610f. Each crossbar output unit 610i includes associated output line 616i connected to header modification circuit 607 including a plurality of header modification units 607i. Header modification circuit 607 is connected to driver circuit 608 which includes a plurality of driver elements 608i. Each driver element 608i receives data from a corresponding header modification unit 607i. Output data is accordingly produced on output lines 609 according to clock 606.

Figure 7A:
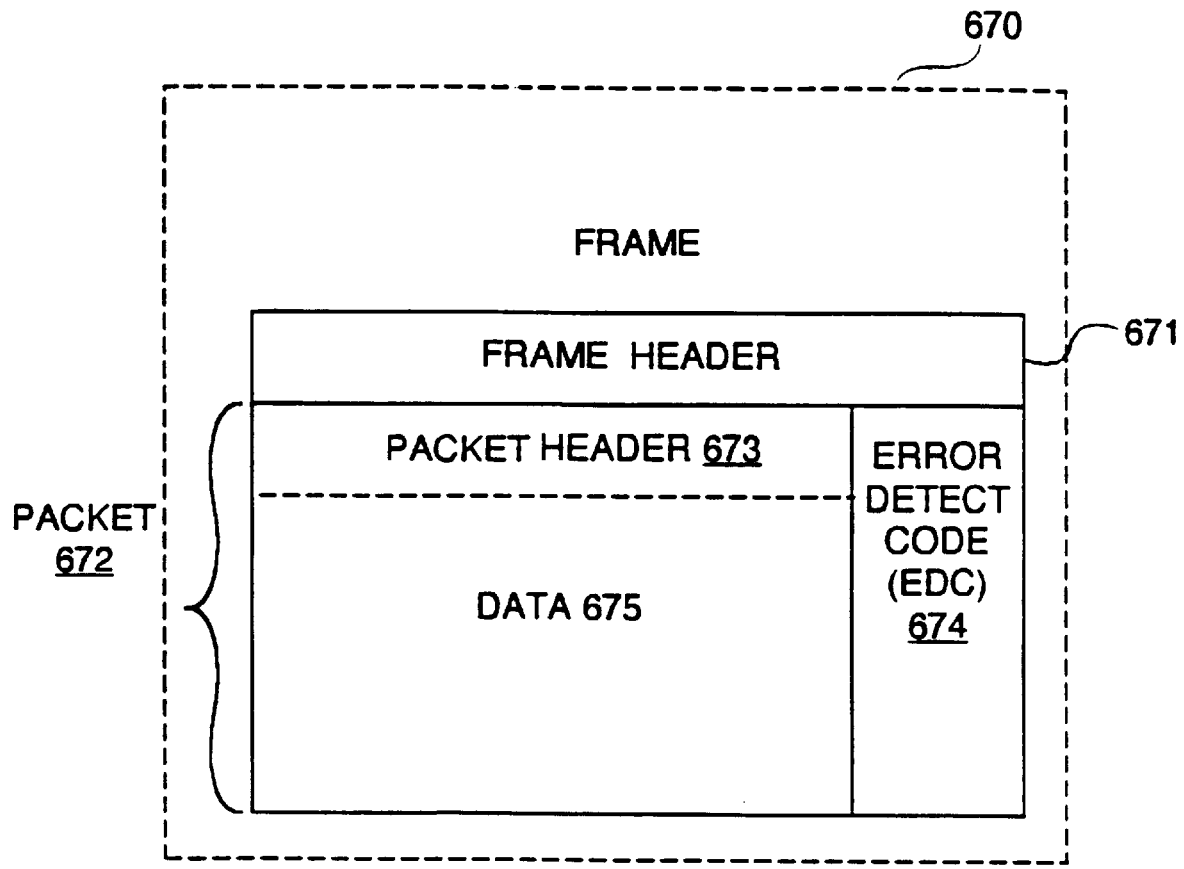
FIG. 7A is a block diagram of a frame transmitted according to the present invention.

FIG. 7A is a block diagram of a frame 670 transmitted according to the present invention. In particular, frame 670 includes a frame header 671 and a packet 672. Frame header 671 includes fields for output port number, a priority field, and an input buffer address. Packet 672 further includes a packet header 673, error detection code (EDC) 674, and data 675.

Figure 7B:
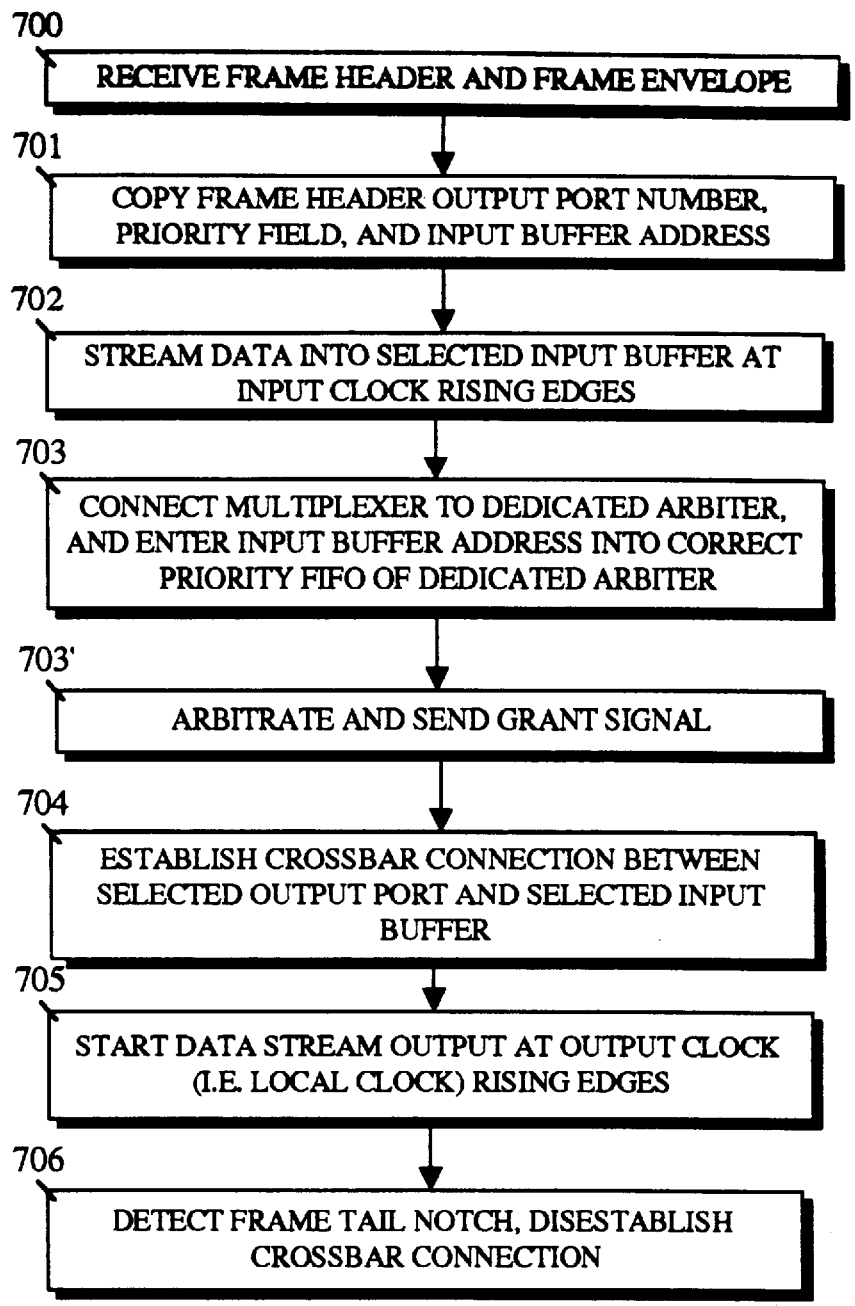
FIG. 7B is a flow chart of a method according to the present invention.

FIG. 7B is a flow chart of a method according to the present invention. According to the method shown in FIG. 7B, a frame header 671 is received 700 by router system 3. Additionally, router system 3 receives a frame envelope signal in parallel with frame 670, to indicate the arrival of frame 670 and additionally its pending complete transmission. According to one embodiment of the present invention, the frame envelope signal includes a notch as will be described in detail below in connection with FIG. 7D. According to the present invention, the frame header output port number, the priority field, and the input buffer address are copied 701. Next, frame 670 streams 702 into a selected input buffer at input clock rising edges. The output ports are separately clocked plesiochronously. Additionally, multiplexer 128' is connected 703 along one of lines 128" to a dedicated one of arbiters 146 according to the output port selected in the frame headers, permitting entry of the input buffer address into a correct priority FIFO of the dedicated one of arbiters 146 which arbitrate over a choice of connections, and then selects a particular input buffer to output port connections, and then sends a "grant" signal. Further, a crossbar connection is established 704 between the selected output port and the selected input buffer. Then, frame header 671, EDC 674, packet header 673, and data 675 begins 705 to stream out of router system 3 through its selected output port at the rising edges of the output or local clock, according to plesiochronous operation, which does not require precisely synchronizing input and output clocks.

Finally, the frame tail notch is detected 706, halting data transmission from the output port and disestablishing the crossbar connection between a particular input buffer and output port.

Figure 7C:
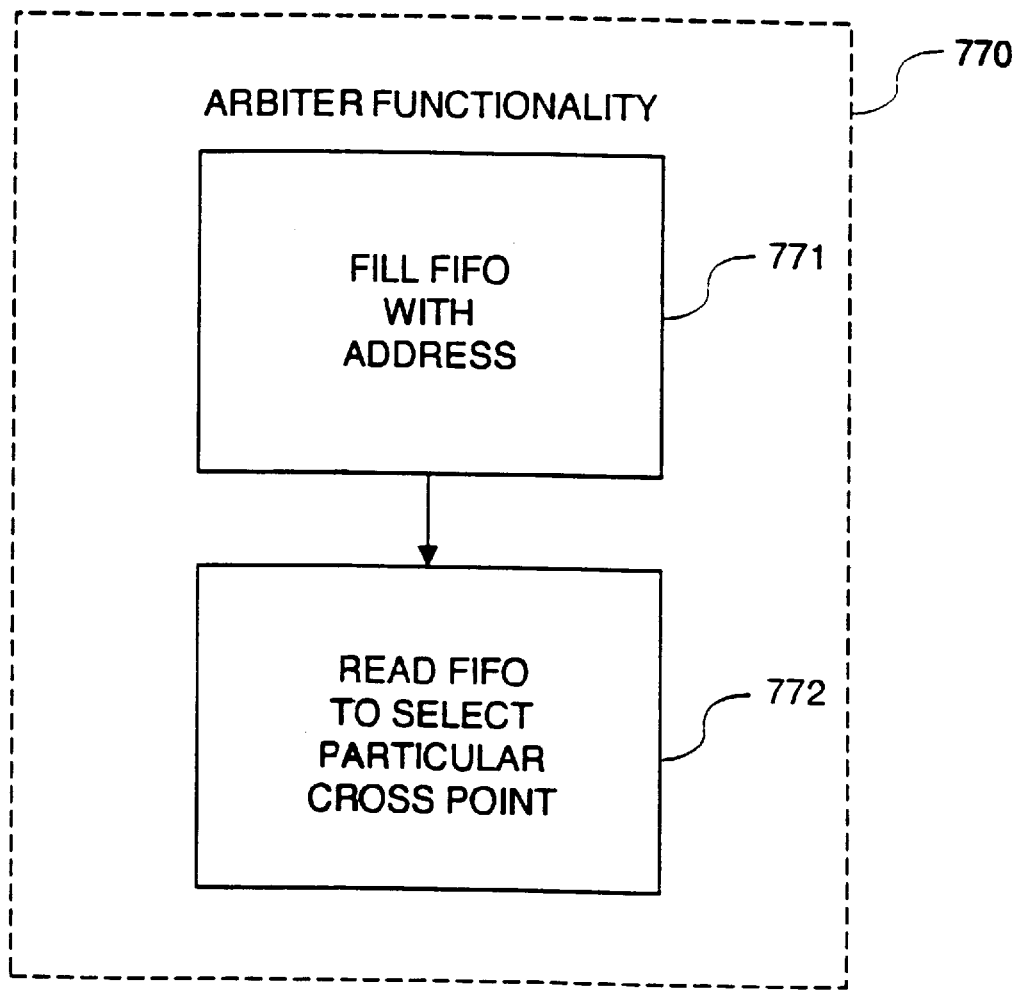
FIG. 7C is a flow chart of arbiter functionality according to the present invention.

FIG. 7C is a flow chart of arbiter functionality 770 according to the present invention. In particular, the flow chart of FIG. 7C describes features of arbiters 146 according to the present invention. The method according to the present invention, includes filling 771 a particular first in first out (FIFO) buffer of arbiters 146 with the address of a selected input buffer to which the output port associated with the selected one of arbiters 146 is to be connected. Next, the particular FIFO is read 772 to select a particular cross point of cross point switch 144', effecting the connection between the associated output port with the selected input buffer.

Figure 7D:
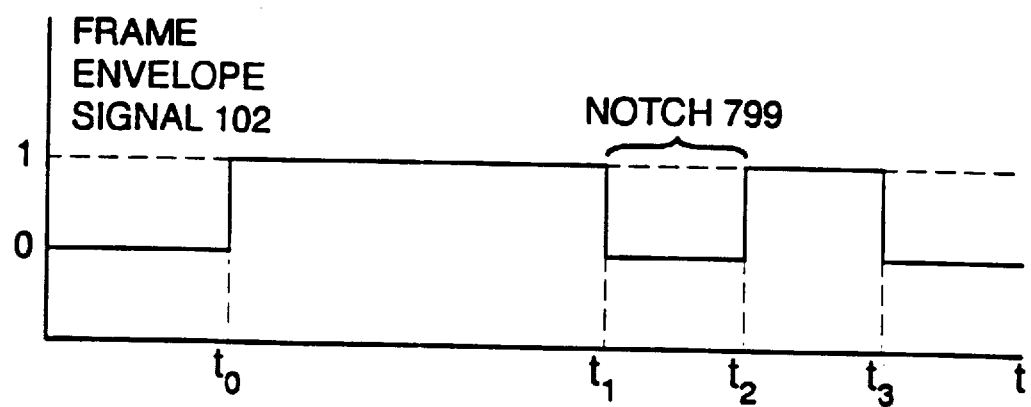
FIG. 7D is a timing diagram of a frame envelope signal according to the present invention.

FIG. 7D is a timing diagram of a frame envelope signal 102 (F_ENV) according to the present invention. Frame envelope signal 102 is provided to buffer 105 in parallel with data, as shown in FIG. 1. FIG. 7D shows frame envelope signal 102 having first and second logical states, respectively 1 and 0. According to one embodiment of the present invention, frame envelope signal 102 is set to 0 when parallel data is not being provided in parallel. Frame envelope signal 102 rises to logical state 1 at time t0 when parallel data is being provided. Parallel data ceases to be provided at time t3, at which time the logical state of frame envelope signal 102 may return to zero, 0. According to the present invention, the return to zero is anticipated by a notch in the signal level of frame envelope signal 102 between predetermined times t1 and t2, during which interval the logical level of frame envelope signal 102 persists at a zero logical level. Such anticipation facilitates the timely release of cross bar switch 144' from its dedicated state connecting a selected input buffer to a particular output port.

FIG. 7E is a timing diagram of frame virtual cutthrough according to the present invention, in which the transmission of header and data information is staggered in independent words of information. As indicated in FIG. 7D, between t0 and t3 of frame envelope signal 102, header and data information are transmitter through the selected router chip. In particular, words of data and header information is transmitted in independent words, and transmission begins immediately with receipt to the header in a selected input buffer, without checking whether all the data has been received by prior selected input port buffers. Thus, the header of a particular frame will already have been transmitted to a next router chip, without any restraint to check whether all the words of the particular frame have even been received at any designated input buffer.

What is claimed is:

1. A router circuit for communicating with neighboring circuits comprising:

a plurality of input ports for receiving frames of data, each frame including a plurality of data words;

a plurality of output ports for transmitting frames of data;

a plurality of input buffers for storing data words received at an input port, at least one input port coupled to send data words to at least two input buffers;

a crossbar switch having a plurality of inputs and outputs, each input buffer coupled to an input of the crossbar switch dedicated to said input buffer, each output port coupled to an output of the crossbar switch dedicated to said output port, the crossbar switch for switchably coupling any input buffer to any output port; and a plurality of arbiter subsystems, at least one arbiter subsystem dedicated to each output port, each arbiter subsystem for non-iteratively selecting a connection path from one of the input buffers, through the crossbar switch, and to the corresponding output port.

2. A router circuit according to claim 1, further comprising a demultiplexer coupled to receive half words from the input ports and to send whole words to the input buffers, for converting half words provided twice within a single clock cycle to whole words clocked once per cycle.

3. A router circuit according to claim 1, wherein each of said arbiter subsystems can select the connection path within one clock cycle.

4. A router circuit according to claim 1, further comprising a synchronization circuit.

5. A router circuit according to claim 4, wherein said synchronization circuit includes read and write pointers for reading to and writing from the input buffers.

6. A router circuit according to claim 5, wherein said read and write pointers identify the same input buffer.

7. The router circuit according to claim 5, wherein the read pointers are operating on a local clock domain and the write pointers are operating on an incoming clock. domain.

8. In a router circuit comprising a plurality of input buffers, a plurality of output ports, a crossbar switch coupling the input buffers to the output ports, and a plurality of arbiter subsystems at least one arbiter subsystem dedicated to each output port a method of transmitting information from one of the plurality of input buffers to one of the plurality of output ports, the method comprising receiving information at one of the input buffers;

detecting a destination output port for the received information;

providing the arbiter subsystem dedicated to the destination output port with the address of said input buffer, responsive to the provided address, causing said arbiter subsystem to non-iteratively select a connection path from said input buffer, through the crossbar switch, and to the destination output port, and configuring the crossbar switch to connect the addressed input buffer with the output port corresponding to said one arbiter subsystem.

9. The method of claim 8 wherein:

the method further comprises providing a priority of the information received at said input buffer to the arbiter subsystem dedicated to the information's destination output port; and the step of causing the arbiter subsystem to non-iteratively select the connection path is further responsive to the provided priority.

10. The method of claim 9 wherein the step of causing the arbiter subsystem to non-iteratively select the connection path occurs within one clock cycle.

* * * * *